… … …

3,290,326
ESTERS OF 4-LOWER ALKYL-5-OXAZOLE-CARBAMIC ACID AND INTERMEDIATES THEREFOR
Max Hoffer, Nutley, N.J., assignor to Hoffmann-La Roche Inc., Nutley, N.J., a corporation of New Jersey
No Drawing. Filed Aug. 17, 1964, Ser. No. 389,829
16 Claims. (Cl. 260—307)

This application is a continuation-in-part of application Serial No. 310,464, filed September 20, 1963, in the name of Max Hoffer, now abandoned.

The invention relates to novel compounds, novel intermediates therefor, and processes for preparing same. More particularly, the invention relates to N-(5-oxazole) urthans which are esters of 5-oxazolecarbamic acid, to novel intermediates useful in making such urethans and to novel processes for preparing same.

The novel urethans of the present invention are compounds of the formula

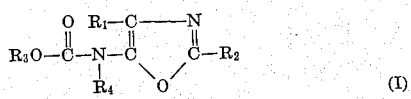

(I)

wherein $R_1$ is lower alkyl; $R_2$ is hydrogen; $R_3$ is selected from the group consisting of lower alkyl, halo-lower alkyl, lower alkenyl, halo-lower alkenyl, $C_5$–$C_6$ cycloalkyl, ar-lower alkyl, a 6-membered heterocyclic aromatic ring having one hetero atom, a lower alkyl group having a 5-membered heterocyclic aromatic ring containing one hetero atom substituted thereon, a lower alkyl group having a 6-membered heterocyclic aromatic ring structure containing one hetero atom substituted thereon and aryl, preferably a monocyclic or dicyclic hydrocarbon such as phenyl or napthyl, optionally unsubstituted or substituted with, for example, a lower alkyl group, a halo group, a lower alkoxy group or a mixture of such groups; $R_4$ is hydrogen, lower alkyl, halo-lower alkyl, lower alkenyl or a benzyl group, either unsubstituted or substituted with, for example, a halo group or a lower alkyl group, and acid addition salts thereof with pharmaceutically acceptable acids.

The compounds of Formula I above can either be referred to as urethans or carbamic acid esters since both of these expresisons are used interchangeably by workers in the art to connote compounds having the Formula I above.

In a preferred embodiment, $R_1$ in Formula I above is methyl. Thus, N-(4-methyl-5-oxazole) urethanes or, in different terms, 4-methyl-5-oxazolecarbamic acid esters are preferred.

A preferred group of compounds within the class represented by Formula I above constitutes those encompassed by the following structural formula

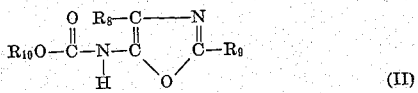

(II)

wherein $R_8$ is lower alkyl; $R_9$ is hydrogen; $R_{10}$ is slected from the group consisting of lower alkyl, preferably ethyl, and aryl, preferably having less than 11 carbon atoms and, still more preferably, phenyl. Advantageously, therefore, $R_{10}$ is selected from the group consisting of lower alkyl and phenyl.

Another group of compounds which have been found to be particularly advantageous for the purposes of the present invention are N-lower alkenyl (preferably allyl)-4-lower alkyl (preferably methyl)-5-oxazolecarbamic acid lower alkyl (preferably ethyl) esters (compounds of the Formula IIa).

The term "alkyl," as used throughout the disclosure, comprehends both straight and branched chain hydrocarbon groups, for example, lower alkyl groups such as methyl, ethyl, N-propyl, isopropyl, butyl, isobutyl, tertiary butyl, 2-ethylbutyl, hexyl and the like. Similarly, the term "lower alkoxy" comprehends groups such as methoxy, ethoxy, butoxy and the like. Also, the term "lower alkenyl" comprehends straight and branched chain monoethylenically unsaturated hydrocarbon groups such as allyl, methylallyl, $\beta,\beta$-dimethylallyl, propenyl and the like. The term "aryl" and the expression "ar-lower alkyl" represent, respectively, a group such as a substituted or an unsubstituted phenyl or naphthyl group or a group such as phenyl-lower alkyl, e.g. benzyl, phenethyl and the like and alkyl and derivatives of such ar-lower alkyl groups having substituents on the "ar" portion of such groups, e.g. p-halobenzyl and the like. The expression "lower alkoxy aryl" connotes a group such as phenyl having a lower alkoxy radical of the type enumerated above substituted thereon, e.g. 4-methoxy-phenyl. The term "lower alk-aryl" and the like comprehends, for example, a substituted phenyl group such as p-tolyl. "Halo aryl" and the like represent, for example, a halogen-substituted phenyl group such as an ortho-chlorophenyl group or a 3,4-dichlorophenyl group. The term "halogen," as used throughout the disclosure, is intended to encompass all the four forms thereof, i.e. chlorine, bromine, fluorine and iodine. The expression "$C_5$–$C_6$ cyclo alkyl" includes a cyclopentyl group and a cyclohexyl group.

As is evident from the above, the term "aryl" is intended to encompass a group such as a substituted or an unsubstituted phenyl group or a naphthyl group. Accordingly, included within the scope of the term "aryl" as employed throughout the instant disclosure, are such groups as a phenyl group, a halophenyl group, a lower alkoxyphenyl group, a phenyl group containing two or more substituent groups such as a halo group, an alkyl group, a lower alkoxy group and the like which may be the same or different, e.g. a halo-lower alkyl phenyl group. The term "benzyl" is similarly intended to encompass a benzyl group which can be unsubstituted or substituted. Thus, the term "benzyl," as used throughout the subject disclosure, is intended to connote a group such as an unsubstituted benzyl group, a halo-substituted benzyl group, a lower alkyl substituted benzyl group and the like.

Representative of 5- and 6-membered heterocyclic aromatic rings having one hetero atom and of lower alkyl groups substituted with such ring structures are thienyl lower alkyl, e.g. thienyl methyl, furfuryl, pyrrolyl lower alkyl, e.g. pyrrolyl methyl, pyridyl lower alkyl, e.g. pyridyl methyl, pyrrolyl and pyridyl. As is evident from the above, the hetero atom may be sulfur, oxygen or nitrogen.

The urethans of Formulae I, II and IIa above form acid addition salts. The acid addition salts are obtained by treating compounds of Formulae I, II and IIa above with pharmaceutically acceptable acids such as inorganic acids, e.g. hydrochloric, hydrobromic, sulfuric, phosphoric and the like, and organic acids such as maleic, succinic, glutaric, tartaric, citric, toluenesulfonic and the like.

The carbamic acid esters of Formula I, Formula II and Formula IIa above are valuable medicinal agents. They can be administered internally with dosage adjusted to individual requirement, for example, orally or parenterally, in convenient pharmaceutical dosage forms such as tablets, solutions, suspensions, capsules and the like, with or without excipients. These compounds are useful as monoamine oxidase inhibitors. That is, they inhibit the activity of monoamine oxidase. They are useful in psychotherapy for the relief of disturbed or depressed states. Thus, they function efficaciously as antidepressants.

The novel compounds of this invention of Formulae I, II and IIa above can be prepared by several different courses of procedure. One of these routes uses compounds of the formula

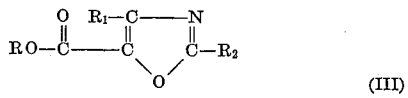

(III)

wherein $R_1$ and $R_2$ have the same meaning as in Formula I above and R is selected from the group consisting of hydrogen and lower alkyl, e.g. 4-methyl-5-oxazolecarboxylic acid ethyl ester, as the starting material.

This reaction route involves reacting the said carboxylates of Formula III above such as a 4-methyl-5-oxazolecarboxylate with hydrazine. This reaction produces a 5-oxazolecarboxylic acid hydrazide. Thus, for example, 4-methyl-5-oxazolecarboxylic caid ethyl ester can be reacted with hydrazine to form 4-methyl-5-oxazolecarboxylic acid hydrazide.

The 5-oxazolecarboxylic acid hydrazide, so obtained, which would correspond to the formula

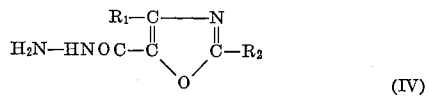

(IV)

wherein $R_1$ and $R_2$ have the same meaning as ascribed thereto hereinabove, can then be subjected to treatment with nitrous acid to yield the corresponding azide of the formula

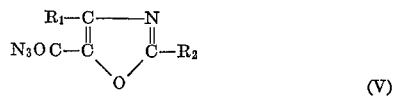

(V)

wherein $R_1$ and $R_2$ have the same meaning as in Formula I above.

The azide of Formula V is added to an inert solvent and, the resultant mixture, in one embodiment, is heated, thereby losing nitrogen with rearrangement to the corresponding isocyanate with the formula

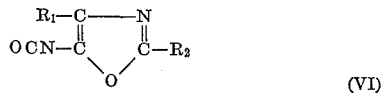

(VI)

wherein $R_1$ and $R_2$ have the same meaning as in Formula I above.

The inert solvent which serves as the medium in which the isocyanate is prepared can be selected from any conveniently available solvent. All that is required of the solvent is that it be non-miscible with water and boil at a temperature whereby loss thereof at temperatures required for the rearrangement to the isocyanate is avoided. Representative of such solvents are toluene, benzene and xylene, ethers such as isopropyl ether and the like.

Another method of preparing the carbamates of Formulae I, II and IIa above involves subjecting amides of the formula

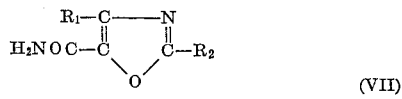

(VII)

wherein $R_1$ and $R_2$ have the same meaning as in Formula IV above to the action of alkali and halogen thereby preparing an intermediate having the formula

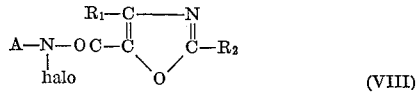

(VIII)

wherein $R_1$ and $R_2$ are as above and A is the cation of any conveniently available alkali such as sodium hydroxide.

The halogen used in the reaction of the amide of Formula VII above to the intermediate of Formula VIII above is preferably chlorine or bromine and the alkali used is any conveniently available alkali such as an alkali metal hydroxide, e.g. sodium hydroxide.

The amides of Formula VII can be made by conventional techniques such as the reaction of the carboxylic acid esters of Formula III above with ammonia.

The isocyanates of Formula VI above or the halo amides of Formula VIII above, obtained according to the different courses of procedure outlined hereinabove, can be converted to the corresponding 5-oxazolecarbamic acid ester of Formula I above wherein $R_4$ is hydrogen by reacting the isocyanates of Formula VI above, or the halo amides of Formula VIII above, with a compound corresponding to the formula of $$R_3OH \qquad (IX)$$

wherein $R_3$ is as in Formula I above.

This reaction can be conducted at room temperature, at above or below room temperature, and/or at elevated or depressed pressures, in the presence or absence of an inert organic solvent which may be any conveniently available inert organic solvent such as toluene, benzene and the like. Preferably, the inert solvent utilized in the conversion of the isocyanate to the urethan is the same as the solvent employed in preparing the isocyanate.

In an alternate embodiment for the preparation of compounds of Formula I above wherein $R_4$ is hydrogen and compounds of Formula II above, the azide of Formula V is added to a compound of the formula $R_3OH$. The resultant mixture is thereafter heated whereby elimination of nitrogen and formation of compounds of Formula I above wherein $R_4$ is hydrogen and Formula II above occurs. The compound of the formula $R_3OH$ can serve as the medium in which the reaction takes place. Alternately, compounds of the formula $R_3OH$ can be added to a mixture of an inert solvent and the azide of Formula V above, and the inert solvent can serve as the reaction medium. Suitable inert solvents may be represented by toluene, benzene, xylene, isopropyl ether and the like, although the particular solvent employed is not critical. Here again, all that is required of the solvent is that it be non-miscible with water and be of a sufficiently high boiling point to ensure that in the subsequent reaction with compounds having the formula of $R_3OH$, the reaction temperature can be maintained sufficiently high as to effect elimination of nitrogen and yet avoid loss of solvent. This reaction can be conducted at room temperature, at above or below room temperature and/or at elevated or depressed pressures.

Compounds corresponding to Formula I above wherein $R_4$ is lower alkyl, halo-lower alkyl, lower alkenyl or benzyl, including substituted derivatives thereof, can be synthesized from compounds corresponding to Formula I above wherein $R_4$ is hydrogen. Such a synthesis can be efficaciously effected by treating compounds corresponding to Formula I above wherein $R_4$ is hydrogen with an alkali metal alcoholate, e.g. a sodium alcoholate, such as sodium methoxide, or with aqueous sodium hydroxide in the presence of any conveniently available solvent, for example, dimethylformamide, water, or a lower alkanol such as methanol and the like to thereby form the N-alkali metal derivatives of such compounds, preferably, the N-sodio derivatives. Such derivatives are then reacted with an appropriate sulfate or an appropriate halide whereby to prepare the corresponding compound of Formula I above wherein $R_4$ is lower alkyl, halo-lower alkyl, lower alkenyl, benzyl and the like. Suitable sulphates may be represented by dimethyl sulphate and the use thereof results in compounds of Formula I above wherein $R_4$ is lower alkyl. Representative of halides suitable for the purposes of the present invention are lower alkyl halides, e.g. methyl iodide, benzyl halides, e.g. benzyl chloride, p-chlorobenzyl chloride and the like, lower alkenyl halides, e.g. allyl bromide and the like. Utilizing lower alkyl halides gives compounds of Formula I above wherein $R_4$ is lower alkyl; benzyl halides give such compounds wherein $R_4$ is benzyl and; lower alkenyl halides yields such compounds wherein $R_4$ is lower alkenyl. It is preferred to utilize compounds of Formula I above wherein $R_3$ is lower alkyl and $R_4$ is hydrogen to prepare compounds of Formula I above wherein $R_4$ is other than hydrogen.

The foregoing is a general description of the main synthetic routes in the preparation of 5-oxazolecarbamic acid esters and the analogues thereof. It will be readily apparent to one skilled in the art that variations of these procedures are possible. Of particular advantage as preparative procedures are the methods thoroughly discussed above. Especially preferred is the method which involves the reaction of the 5-oxazolecarboxylic acid hydrazide with nitrous acid to form the azide, and the subsequent rearrangement with the attendant loss of nitrogen to the corresponding urethan.

The intermediates formed in proceeding from the carboxylates of Formula III above or the amides of Formula VII above to the carbamic acid esters of Formulae I and II above can be further reacted in the manner specified hereinabove with or without the isolation thereof from the reaction medium in which such intermediates are prepared. Such intermediates are novel and constitute a part of the present invention.

The following examples are illustrative but not limitative of the compounds of this invention and the procedures for their preparation. All temperatures stated are in degrees centigrade.

Example 1

A three-neck, 1 l. flask equipped with a stirrer and thermometer containing 77.5 g. of 4-methyl-5-oxazolecarboxylic acid ethyl ester was heated to 35–40° whereby to maintain the ester in a molten state. There was then added to the flask, 70 ml. of 85 percent hydrazine hydrate solution. The resultant mixture was stirred at 40 to 45° under occasional cooling with cold water for a period of 15 minutes. 400 ml. of ethanol, previously cooled to 0°, was added and the resultant mixture was allowed to stand at 0–5° for 20 hours during which time a precipitate formed. The mixture was filtered by suction. The precipitate remaining on the filter was pressed dry and then washed with 50 ml. of ice cold alcohol. The precipitate was dried at 50 to 70°. The residue was recrystallized from alcohol, yielding 4-methyl-5-oxazolecarboxylic acid hydrazide, melting point 163–164°.

Example 2

28.2 g. of 4-methyl-5-oxazolecarboxylic acid hydrazide was added to a beaker containing 70 ml. of 3 N aqueous sulfuric acid. 200 g. of crushed ice was then added to the beaker. A solution of 15 g. of sodium nitrite in 60 ml. of water was carefully added with stirring. The mixture was allowed to stand for 10 to 15 minutes, during which time a precipitate formed. The precipitate was extracted in two steps, employing 100 ml. of ether in each of the extraction steps. The combined ether layers were dried over sodium sulfate and finally evaporated in a vacuum at 25 to 35°, yielding 4-methyl-5-oxazolecarboxylic acid azide, a crystalline material having a melting point of about 40°, as a residue. The azide was dissolved in 400 ml. of ethanol. The resultant solution was refluxed on a steam bath under anhydrous conditions for 6 hours. After evaporation of the solvent in a vacuum, the residue was recrystallized from 140 ml. of water yielding 4-methyl-5-oxazolecarbamic acid ethyl ester, melting point 119°.

Example 3

28.2 g. of 4-methyl-5-oxazolecarboxylic acid hydrazide was added to a stirrer-equipped, 2 l. flask containing 70 ml. of 3 N aqueous sulfuric acid. 200 g. of crushed ice was then added, followed by the addition of 400 ml. of toluene. After stirring the resultant mixture, a solution of 20 g. of sodium nitrite in 60 ml. of water was added. The toluene layer was separated and dried over 20 g. of anhydrous magnesium sulfate and filtered. 20 g. of phenol was added to the clear toluene solution containing 4-methyl-5-oxazolecarboxylic acid azide. The mixture was refluxed with stirring for 3 hours. The toluene was removed by distillation in a vacuum and the excess phenol was removed by distillation at a bath temperature of 100–120° at 11 mm. The residue solidified upon cooling. The solidified residue was dissolved in 30 ml. of ethyl acetate and precipitated upon chilling (to 0°) in a crystalline form by the gradual addition of heptane. After recrystallizing from 50 percent methanol, there was obtained the phenyl ester of 4-methyl-5-oxazolecarbamic acid, melting point 109–110°.

Example 4

28.2 g. of 4-methyl-5-oxazolecarboxylic acid hydrazide was added to a stirrer-equipped, 2 l. flask containing 70 ml. of 3 N aqueous sulfuric acid. 200 g. of crushed ice was then added to the flask, followed by the addition of 400 ml. of toluene. After stirring the resultant mixture, a solution of 20 g. of sodium nitrite in 60 ml. of water was carefully added. The reaction mixture separated into 2 layers. The toluene layer was separated, dried over 20 g. of anhydrous magnesium sulfate and filtered. The clear toluene solution containing 4-methyl-5-oxazolecarboxylic acid azide was refluxed, with stirring, for 4 hours yielding 4-methyl-5-oxazole isocyanate. The resulting toluene solution of the isocyanate was allowed to cool to 70 to 80°.

To the cooled toluene solution, there was added 26 g. of p-chlorophenol. The resulting mixture was refluxed with stirring for 3 hours. After cooling, there was added to the mixture approximately 30 ml. of a saturated alcoholic hydrogen chloride solution. The hydrochloride of 4-methyl-5-oxazolecarbamic acid p-chlorophenyl ester precipitated. The hydrochloride was collected by filtration and washed on the filter with ether. The precipitate was slurried in 100 ml. of water made slightly alkaline with aqueous ammonia. A crystalline material formed which was filtered by suction. The material was recrystallized twice from 50 percent methanol and dried at 60–70° yielding the free base, 4-methyl-5-oxazolecarbamic acid p-chlorophenyl ester, melting at 105–106°

Example 5

A toluene solution of 4-methyl-5-oxazole isocyanate was prepared as in Example 4. To the cold toluene solution was added 25 g. of hydroquinone monomethyl ether. The resultant mixture was refluxed with stirring for 3 hours. After cooling, there was added to the mixture aproximately 30 ml. of a saturated alcoholic hydrogen chloride solution. The hydrochloride of 4-methyl-5-oxazolescarbamic acid p-methoxyphenyl ester precipitated. The hydrochloride was collected by filtration. The precipitate was slurried in 100 ml. of water made slightly alkaline with aqueous ammonia. A crystalline material formed which was separated by filtration. This material was found to be 4-methyl-5-oxazolecarbamic acid p-methoxyphenyl ester, melting point 85–86°.

Example 6

31.3 g. of 4-chloro-3,5-dimethylphenol was added to a toluene solution of 4-methyl-5-oxazole isocyanate as prepared in Example 4. The resultant mixture was refluxed with stirring for 3 hours. After cooling, there was added to the mixture approximately 30 ml. of a saturated alcoholic hydrogen chloride solution. 4-methyl-5-oxazolecarbamic acid 4-chloro-3,5-dimethylphenyl ester precipitated as its hydrochloride. The hydrochloride was filtered by suction and decomposed by slurrying the same in 100 ml. of water made slightly alkaline with aqueous ammonia. A precipitate formed which was separated by filtration. The residue was recrystallized from dilute methanol yielding 4-methyl-5-oxazolecarbamic acid 4-chloro-3,5-dimethylphenyl ester, melting point 109–110°.

Example 7

22 g. of benzyl alcohol was carefully added to a well-cooled toluene solution of 4-methyl-5-oxazole isocyanate as obtained from 28.2 g. of 4-methyl-5-oxazolecarboxylic acid hydrazide, as in Example 4. The mixture was heated at 60 to 70° for one hour and refluxed for an additional hour. After cooling, the hydrochloride of 4-methyl-5-oxazolecarbamic acid benzyl ester was precipitated by the addition of 30 ml. of saturated alcoholic hydrogen chloride to the cooled solution. The hydrochloride was decomposed with 100 ml. of water containing a sufficient amount of aqueous ammonia to render the water slightly alkaline. 4-methyl-5-oxazolecarbamic acid benzyl ester formed as a precipitate and was obtained after the separation thereof from the ammonia solution by filtration. After recrystallization from toluene, the base melts at 91°.

Example 8

15 g. of 4-methyl-5-oxazolecarboxylic acid azide was heated with 300 ml. of n-butanol on a steam bath for 6 hours. The butanol was distilled off in a vacuum from a hot water bath and the residue distilled at 11 mm. at 157–160°, yielding 4-methyl-5-oxazolecarbamic acid n-butyl ester as a colorless viscous oil with an $n_D^{25}=1.4725$.

Example 9

15 g. of 4-methyl-5-oxazolecarboxylic acid azide was heated with 120 ml. of tertiary butanol for 4 hours on a steam bath. After distilling off the alcohol in a vacuum from a water bath, the residue was slurried with 150 ml. of ether. The ether solution was filtered and the filtrate evaporated to dryness yielding 4-methyl-5-oxazolecarbamic acid tertiary butyl ester having a melting point of 102–103° as the residue.

Example 10

15 g. of 4-methyl-5-oxazolecarboxylic acid azide was dissolved in 200 ml. of 2-chloroethanol and the solution heated on a steam bath for 6 hours under anhydrous conditions. The excess alcohol was removed by distillation in a vacuum employing at water bath. The residue was recrystallized from water yielding 4-methyl-5-oxazolecarbamic acid 2'-chloroethyl ester melting at 114–115°.

Example 11

50 g. of finely divided 4-methyl-5-carbamoyl-oxazole was suspended in 140 ml. of 3 N sodium hydroxide solution at a temperature of 25–32°. 140 ml. of a sodium hypochloride solution (17 percent active chlorine) was carefully added with stirring. The temperature was maintained at 32–33° for 30 minutes by occasionally immersing the vessel in a bath of cold water. The mixture was then chilled to about −5 to 0° and a heavy crystallization of the sodium salt of 4-methyl-5-oxazolecarboxylic acid chloramide took place. The mixture was filtered by suction. The residue was pressed as dry as possible on the filter. It was then dissolved in 500 ml. of abs. ethanol and allowed to stand at 0° overnight. Thereafter, the solution was refluxed on a steam bath for 2 hours. A heavy precipitate developed. The precipitate was filtered off by suction and the filtrate was evaporated in a vacuum. The crystalline residue was recrystallized from water yielding 4-methyl-5-oxazolecarbamic acid ethyl ester, melting point 119°.

Example 12

The sodium salt of 4-methyl-5-oxazolecarboxylic acid chloramide prepared from 50 g. of 4-methyl-5-carbamoyl-oxazole, as in Example 11, was dissolved in 500 ml. of methanol. The resultant solution was refluxed for 2 hours on a steam bath. The precipitate which developed was filtered off. The filtrate was evaporated in vacuo from a steam bath and the residue distilled at 11 mm. at 135–137°. 4-methyl-5-oxazolecarbamic acid methyl ester solidified in the receiver and was found to have a melting point of 109–110°.

Example 13

A warm solution of 30 g. of β-naphthol in 200 ml. of warm toluene was added to a cooled toluene solution of 4-methyl-5-oxazole isocyanate as prepared in Example 4. After refluxing the resultant mixture for 4 hours, the mixture was cooled. The cooled mixture was filtered and to the filtrate was added 20 ml. of alcoholic hydrogen chloride (saturated at 20 to 25°). The hydrochloride of 4-methyl-5-oxazolecarbamic acid β-naphthyl ester precipitated out. The precipitate was separated from the mixture by filtering with suction. The hydrochloride was slurried in water. A precipitate formed when the slurry was neutralized with ammonia. The precipitate was separated by filtration and recrystallized from ethyl alcohol yielding 4-methyl - 5 - oxazolecarbamic acid β-naphthyl ester, melting point 138°.

Example 14

A toluene solution of 4-methyl-5-oxazole isocyanate was prepared as in Example 4. To the cooled toluene solution was added 20 g. of furfuryl alcohol. The resultant mixture was refluxed with stirring for 4 hours. The resultant mixture was allowed to cool and then was evaporated in vacuo to a syrup. The syrup was dissolved in 80 ml. of ether and chilled to −5°. Upon heating, 4-methyl-5-oxazolecarbamic acid furfuryl ester crystallized out. The crystals were separated from the mixture by filtration with suction and then dried. The product had a melting point of 78°.

Example 15

26 g. of 4-methyl-5-oxazolecarbamic acid ethyl ester was dissolved in 52 ml. of a 3 N aqueous sodium hydroxide solution at 10–15°. To the resultant mixture was added 15 ml. of dimethyl sulfate. The resultant mixture was stirred for 2 hours while maintaining the temperature at about 10–15°. 20 ml. of 3 N sodium hydroxide solution was then added with continued stirring. After a period of about one hour, the mixture was extracted twice with 70 ml. of ether. The ether extracts were comined and evaporated. The residue was distilled in a vacuum at 14 mm. at 109–110° yielding 4,N-dimethyl-5-oxazolecarbamic acid ethyl ester, $n_D^{24}=1.4618$.

Example 16

2.5 g. of sodium was dissolved in 50 ml. of methanol. 17 g. of 4-methyl-5-oxazolecarbamic acid ethyl ester was added to the solution. The solution was evaporated in vacuo. The residue was dissolved in 40 ml. of dimethylformamide. 13 g. of p-chlorobenzyl chloride was added to the resultant mixture. The mixture was heated to 60–70° for 15 minutes, diluted with water and then extracted with ether. The ether layer was washed with water and evaporated. The residue, upon chilling, solidified. It was recrystallized from light ligroin yielding N-p-chlorobenzyl-4-methyl-5-oxazolecarbamic acid ethyl ester having a melting point of 35°.

Example 17

508 g. of 4-methyl-5-oxazolecarboxylic acid, 660 g. of thionyl chloride and 10 ml. of dimethylformamide were refluxed on a steam bath for 6 hours. The resultant mixture was distilled at 75–80° in a vacuum of 12 mm. to thereby yield 4-methyl-5-oxazolecarboxylic acid chloride. 568 g. of the chloride was carefully added to 570 ml. of methanol in a flask equipped with a stirrer. The temperature of the mixture rose slowly until it reached the reflux temperature thereof. The mixture was allowed to cool overnight and then was added to a solution of 400 g. of $K_2CO_3$ in 1600 ml. of water. An oil precipitated which was extracted with 300 ml. of methylene chloride. The methylene chloride extract was evaporated in a vacuum and the residue was dissolved in 2 l. of ethanol. The resulting solution was cooled to 10–15° and 500 ml. of 85 percent hydrazine hydrate was added thereto. The mixture was allowed to stand at 15–20° for one hour. Thereafter, it was seeded and allowed to stand for an additional 24 hours at 0°. A crystalline material appeared which was separated by filtration by suction. The material was washed on the filter with 200 ml. of cold alcohol and recrystallized from ethanol yielding 4-methyl-5-oxazolecarboxylic acid hydrazide, melting point 163–164°.

*Example 18*

12 g. of 4-methyl-5-oxazolecarboxylic acid chloride in 100 ml. of benzene was added to a stirred suspension of 6.7 g. of sodium azide in 100 ml. of benzene. The mixture was heated at 40–50°, with stirring, for 2 hours, filtered, and to the filtrate there was added 20 ml. of ethanol. The resultant mixture was refluxed for 6 hours and evaporated in a vacuum. Crystallization of the residue from water yielded 4-methyl-5-oxazolecarbamic acid ethyl ester, melting point 119°.

*Example 19*

To a mixture prepared by adding 4.6 g. of sodium to a 100 ml. of methanol, there was added 34 g. of 4-methyl-5-oxazolecarbamic acid ethyl ester. The resultant mixture was evaporated in a vacuum to an amorphous mass. The mass was dissolved in 80 ml. of dimethylformamide and to the resultant solution, there was carefully added 24.2 g. of allyl bromide. The mixture became warm and reached a temperature of 60°. After the spontaneous reaction ceased, the mixture was heated 80–90° on a steam bath for 30 minutes. It was then chilled, diluted with 200 ml. of water and extracted with ether. The ether extract was washed with 3 N aqueous sodium hydroxide solution and then water. After evaporation of the ether, the product was distilled in a vacuum at 112–113°. N-allyl-4-methyl-5-oxazolecarbamic acid ethyl ester was obtained as a colorless oil, $n_D^{22}=1.4718$.

*Example 20*

To a mixture prepared by the addition of 2.5 g. of sodium to 150 ml. of methanol, there was added 17 grams of 4-methyl-5-oxazolecarbamic acid ethyl ester. The resultant mixture was evaporated in a vacuum to a blistery mass and the mass was dissolved in 40 ml. of dimethylformamide. To the resultant solution, there was carefully added 13 grams of benzyl chloride. The resultant mixture was heated for 15 minutes at 60–80°, chilled, diluted with 200 ml. of water and extracted with ether. The ether extract was dried, partly evaporated, and 100 ml. of petroleum ether, boiling point 60–90° was added thereto. The resultant medium was chilled and seeded whereby a crystallization occurred. The crystalline material was dried over phosphorus pentoxide in vacuo yielding N-benzyl-4-methyl-5-oxazolecarbamic acid ethyl ester of melting point 29–30°. On recrystallization from petroleum ether, boiling point 60–90°, the melting point of the product was raised to 31–32°.

*Example 21*

To a mixture prepared by the addition of 5 grams of sodium to 100 ml. of methanol there was added 34 grams of 4-methyl-5-oxazolecarbamic acid ethyl ester. The mixture was evaporated in vacuo and cooled. The residue was dissolved in 100 ml. of dimethylformamide with heating at 60–70°. After cooling the resultant solution, 40 grams of propyl iodide was added thereto. After the completion of a spontaneous reaction which occurred, the mixture was heated on the steam bath for 15 minutes, then diluted with 250 ml. of water and thereafter extracted with ether (3 ×). The ether extracts were combined and washed with 100 ml. of water, then 20 ml. of 3 N sodium hydroxide and finally with 50 ml. of water. After evaporating the ether, the oil which remained was distilled at 118–120°/12 mm. and found to be N-propyl-4-methyl-5-oxazolecarbamic acid ethyl ester, $$n_D^{25}=1.4588$$

*Example 22*

50 grams of cyclohexanol was added to a cooled toluene solution of 4-methyl-5-oxazole isocyanate prepared from 56.4 grams of 4-methyl-5-oxazolecarboxylic acid hydrazide as in Example 4. The resultant mixture was refluxed with stirring for 3 hours. After cooling, the reaction medium was extracted with ether.

To the ether extract, there was added 30 ml. of an ethanolic hydrogen chloride solution. The hydrochloride of 4-methyl-5-oxazolecarbamic acid cyclohexyl ester precipitated. The hydrochloride was collected by filtration and washed on the filter with ether. The precipitate was slurried in 100 ml. of water and made slightly alkaline with aqueous ammonia. A crystalline material formed. Upon recrystallization from carbon tetrachloride, 4-methyl-5-oxazolecarbamic acid cyclohexyl ester was obtained, M.P. 75–76°.

*Example 23*

To a mixture prepared by adding 7.5 grams of sodium to 150 mls. of methanol, there was added 72 gms. of 4-methyl-5-oxazolecarbamic acid benzyl ester. The resultant mixture was evaporated in vacuo to a blistery mass. The mass was dissolved in 250 ml. of dimethylformamide on a steam bath. The resultant reaction medium was cooled and 38 grams of allyl bromide was carefully added thereto. The reaction medium was kept at 50° for ½ hour, diluted with 500 ml. of water, and then extracted with ether. The ether extract was washed twice with water and once with 3 N sodium hydroxide. After evaporation of the ether in vacuo, N-allyl-4-methyl-5-oxazolecarbamic acid benzyl ester was obtained as an oil. The product was distilled in vacuo, B.P.$_{12}$=185–188° $n_D^{24}=1.5260$.

*Example 24*

To a mixture prepared by adding 7.5 grams of sodium to 150 ml. of methanol, there was carefully added 59.4 grams of 4-methyl-5-oxazolecarbamic acid tertiary butyl ester. The resultant solution was evaporated in vacuo; the residue remaining was dissolved in 120 ml. of dimethylformamide and 40 grams of allyl bromide was added to the resultant solution. The so-formed mixture was heated on a steam bath for 1 hour. After working up the reaction medium as in Example 19, N-allyl-4-methyl-5-oxazolecarbamic acid tertiary butyl ester was distilled at 110°/11 mm. Crystallization occurred on the distillate standing at room temperature. Recrystallization from petroleum ether 60–90° gave the product of melting point 43°.

*Example 25*

Capsules were prepared containing the following ingredients per capsule:

| Ingredients: | Amount, mg. |
|---|---|
| 4-methyl-5-oxazolecarbamic acid phenyl ester | 50 |
| Lactose, U.S.P. | 125 |
| Corn starch, U.S.P. | 30 |
| Talc, U.S.P. | 5 |
| Total net weight | 210 |

The capsules were prepared as follows:

Mix the active ingredient, 4-methyl-5-oxazole carbamic acid phenyl ester with lactose and corn starch in a suitable mixer. Further blend the mixture by passing it through a Fitzpatrick Comminuting Machine with a #1A screen with knives forward. Return the blend to the mixer, add the talc and blend thoroughly. Fill into #4 hard shell gelatin capsules on a Parke Davis capsulating machine.

Example 26

Tablets were prepared containing the following ingredients per tablet:

| Ingredients: | Amount, mg. |
|---|---|
| 4 - methyl - 5 - oxazole carbamic acid phenyl ester | 25.0 |
| Lactose, spray dried | 72.0 |
| Corn starch, U.S.P. | 2.0 |
| Calcium stearate | 1.0 |
| Total Weight | 100.0 |

The procedure for preparing the tablets is as follows:
Blend the active ingredient and the lactose, corn starch, and calcium stearate in a suitable mixer. Compress the powder on a heavy duty tablet compressing machine to yield tablet slugs of about 1″ diameter and ¼″ thickness. Pass the tablet slugs through a suitable comminuting machine to yield granules of approximately 16 mesh with a minimum of fines. Recompress the granulation on a tablet compressing machine using ¼″ standard concave punch to an average tablet weight of 100 mg.

Example 27

A parenteral dosage form containing 100 mg. of 4-methyl-5-oxazole carbamic acid phenyl ester per 10 cc. vial was prepared as follows: (This compound is not stable in water under extended storage conditions. The parenteral preparation is therefore made as a lyophilized solid which is reconstituted with water for injection just prior to use.)

Prepare a 2% solution of the active ingredient in fresh water for injection, solubilizing the drum by the addition of sodium hydroxide to approximately pH 8.5–9.0. Filter the solution through an asbestos pad of 1–2 microns pore opening (Horman D–2, D–4, or equivalent) using vacuum. The filter should be freshly pre-washed with water for injection and excess water removed by vacuum. Filter the solution through an 02 Selas candle into a sterile receiver. Fill 5 ml. aseptically into a sterile, 10 cc. flint, Type I glass vial with 20 mm. B corkage (0.500 inch internal diameter). Stopper the vial aseptically with special lyophilization grooved stopper (West Rubber Co., S–87H, 815 butyl gray), allowing the groove openings to remain open for passage of water vapor during lyophilizing.

Lyophilization—Lyophilize in suitable lyophilizing equipment having shelf freezing, heat supply and internal condensers, operating the vacuum down to 5–10 microns of mercury under the following conditions:

Freeze the vials to −45° to −50°. These are the temperatures of thermocouples (probes) inside the control vials. The shelf is actually at −55° to −60°. Set the condenser refrigeration to −60°. Apply vacuum to below 20 microns of mercury and apply heat to shelves by circulating liquid for 24 hours, vacuum at 10–20 microns. Raise the shelf temperature to 28° for 24 hours, vacuum at 10–20 microns. Raise the shelf temperature to 40° for 24 hours; vacuum at 10–20 microns. Release the vacuum partially by dry, sterile nitrogen to an internal vacuum of about 100 mm. mercury and seal the vials by use of an internal stoppering press plate. Thereafter, release the remainder of the vacuum and open the lyophilizer. The vials are then capped with 20 mm. aluminum seals. The small residual vacuum in the vials (100 mm. mercury) allows the stopper to be held on for the capping process and compensates for the volume displacement of the stopper being forced into the vial by automatic stoppering.

A Repp 101 Lyophilizer is employed above. Other lyophilizers may also be used with suitable modifications of the procedures set out above to fit existing conditions.

Example 28

Capsules were prepared containing the following ingredients per capsule.

| Ingredient: | Amount, mg. |
|---|---|
| N-allyl-4-methyl-5-oxazole-carbamic acid ethyl ester | 25.5 |
| Silicic acid | 50.0 |
| Lactose | 109.5 |
| Corn starch | 30.0 |
| Talc | 5.0 |
| Total | 220.0 |

The preparative procedure employed for forming the capsules is as follows:

Dissolve the active ingredient in a small volume of 30% alcohol–70% water solution and pour the mixture over the silicic acid in a suitable size mixer. Dry the moist adsorbate on paper lined trays at 44°. Return the adsorbate to the mixer, add the lactose and corn starch and mix well. Pass the mixture through a Fitzpatrick Comminuting Machine with a #1A screen and knives forward. Return the granules to the mixer and add the talc. Blend well and fill into No. 4, two piece, hard shell gelatin capsules on a Parke Davis capsulating machine.

Example 29

Tablets were prepared containing the following ingredients per capsule.

| Ingredient: | Amount, mg. |
|---|---|
| N-allyl-4-methyl-5-oxazole-carbamic acid ethyl ester | 10 |
| Silicic acid | 25 |
| Lactose | 114 |
| Corn starch | 50 |
| Pregelatinized corn starch | 8 |
| Calcium stearate | 3 |
| Total | 210 |

Dissolve the active ingredient in a small volume of a 30% ethanol–70% water solution and adsorb onto the silicic acid which has been placed in a suitable size mixer. Add the lactose, corn starch and pregelatinized corn starch and mix well. Moisten the resulting mixture with water to a thick paste. After the moist mass is passed through a No. 12 screen, it is dried on paper-lined trays at 44°. Pass the dried granules through a No. 14 screen, place in a suitable size mixer, add the calcium stearate and mix well. Compress the granules at a tablet weight of 210 mg. using standard concave punches having a diameter of 5/16″.

Example 30

A parenteral dosage form was prepared containing the following ingredients per cc.

| Ingredient: | | Amount |
|---|---|---|
| N-allyl-4-methyl-5-oxazole-carbamic acid ethyl ester | mg | 5.1 |
| Propylene glycol | cc | 0.4 |
| Benzyl alcohol (benzaldehyde free) | cc | 0.015 |
| Ethanol (anhydrous) | cc | 0.10 |
| Sodium benzoate | mg | 48.8 |
| Benzoic acid | mg | 1.2 |
| Water for injection, q.s., | cc | 1.0 |

The procedure for preparing the parenteral dosage form is as follows:

Dissolve 51 gm. of active ingredient in 150 cc. of benzyl alcohol and add 4,000 cc. of propylene glycol and 1,000 cc. of ethanol to the resulting medium. Dissolve 12 gm. of benzoic acid in the above and then add 488 gm. of sodium benzoate dissolved in 3,000 cc. of water for injection. Q.s. to 10,000 cc. with water for injection. Filter through an 02 Selas candle, fill into suitable size ampuls, gas with $N_2$ and seal. Autoclave at 10 p.s.i. for 30 minutes.

I claim:
1. A compound selected from the group consisting of compounds of the formula

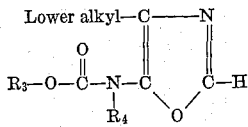

and acid addition salts thereof with pharmaceutically acceptable acids
wherein $R_3$ is selected from the group consisting of lower alkyl, halo-lower alkyl, lower alkenyl, halo-lower alkenyl, $C_5$–$C_6$ cycloalkyl, phenyl-lower alkyl, substituted phenyl-lower alkyl, naphthyl, unsubstituted phenyl, mono-substituted phenyl, di-substituted phenyl and trisubstituted phenyl wherein the substituents are selected from the group consisting of halogen, lower alkyl and lower alkoxy; thienyl-lower alkyl, furfuryl, pyrrolyl-lower alkyl, pyridyl-lower alkyl, pyrrolyl and pyridyl and $R_4$ is selected from the group consisting of hydrogen, lower alkyl, halo-lower alkyl, lower alkenyl and benzyl.

2. N-(4-lower alkyl-5-oxazole)urethan.
3. N-(4-methyl-5-oxazole)urethan.
4. 4-lower alkyl-5-oxazolecarbamic acid lower alkyl ester.
5. 4-methyl-5-oxazolecarbamic acid N-butyl ester.
6. N-p-chlorobenzyl-4-methyl-5-oxazolecarbamic acid ethyl ester.
7. N-lower alkenyl-4-lower alkyl-5-oxazolecarbamic acid lower alkyl ester.
8. N-allyl-4-methyl-5-oxazolecarbamic acid lower alkyl ester.
9. 4-lower alkyl-N-lower alkyl-5-oxazolecarbamic acid lower alkyl ester.
10. 4-methyl-N-propyl-5-oxazolecarbamic acid lower alkyl ester.
11. 4-methyl-N-propyl-5-oxazolecarbamic acid ethyl ester.
12. A compound of the formula

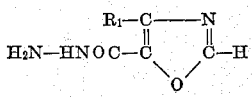

wherein $R_1$ is selected from the group consisting of lower alkyl.

13. A compound of the formula

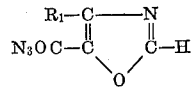

wherein $R_1$ is selected from the group consisting of lower alkyl.

14. A compound of the formula

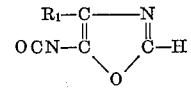

wherein $R_1$ is selected from the group consisting of lower alkyl.

15. A compound of the formula

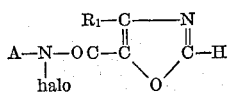

wherein $R_1$ is selected from the group consisting of lower alkyl and A is an alkali metal cation.

16. 4-lower alkyl-5-oxazolecarbamic acid-$R_{20}$-ester wherein $R_{20}$ is selected from the group consisting of phenyl and naphthyl.

References Cited by the Examiner

FOREIGN PATENTS 875,458   8/1961   Great Britain.

OTHER REFERENCES

Jansen et al.: J. Chem. Soc. (London), 1961, p. 405, 6.
Migrdichian, V.: Organic Synthesis, New York, Reinhold Publishing Corp., 1957, pp. 383, 395, 397, and 398.
Tanaka et al.: Ykugaku Zasshi, vol. 82, pp. 136–9 (1962).
Tanaka et al.: Chem. Abstracts, vol. 58, p. 3408d, (1963).

ALEX MAZEL, *Primary Examiner.*

HENRY R. JILES, RICHARD J. GALLAGHER,
*Assistant Examiners.*